L. W. COPPOCK.
PROCESS OF FORMING STEEL CONNECTING RODS.
APPLICATION FILED FEB. 23, 1910.
986,547.
Patented Mar. 14, 1911.
4 SHEETS—SHEET 2.
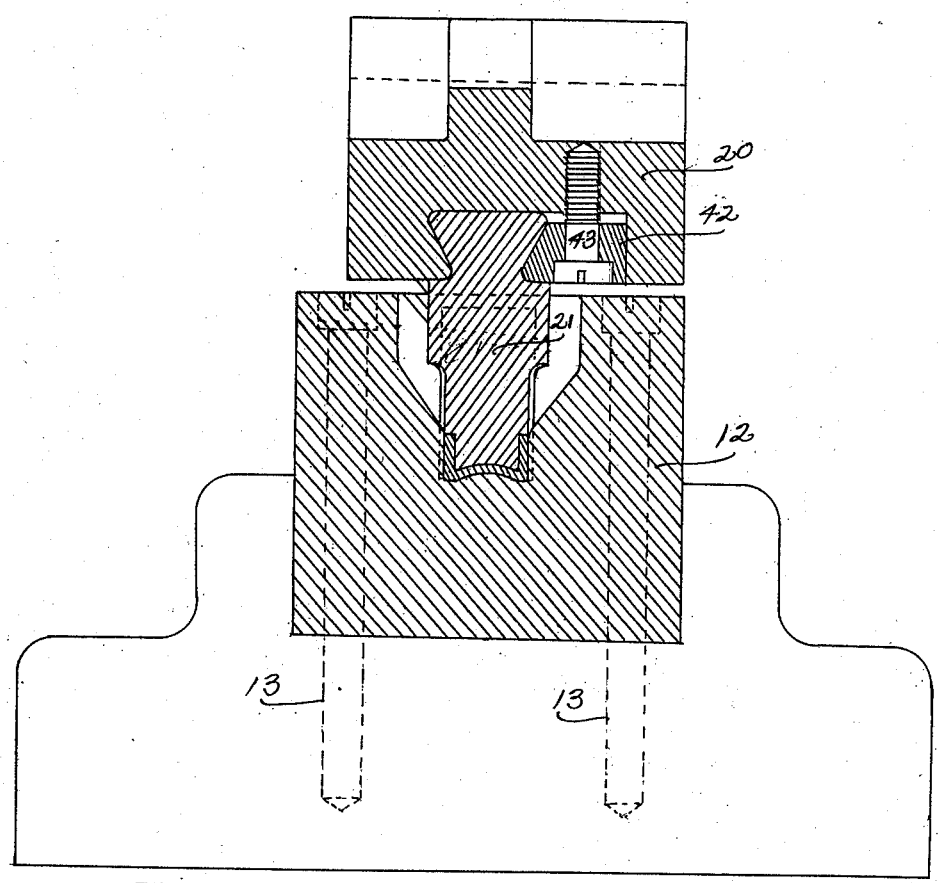
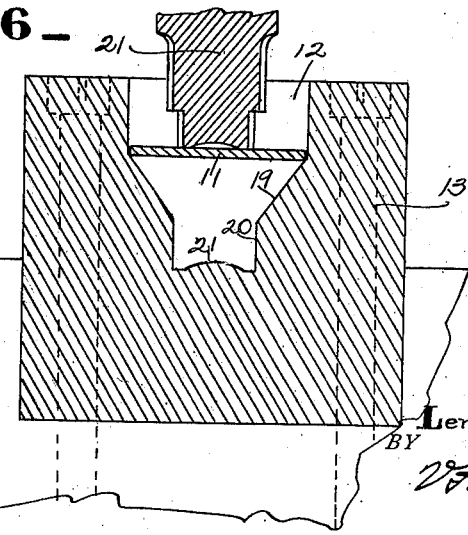

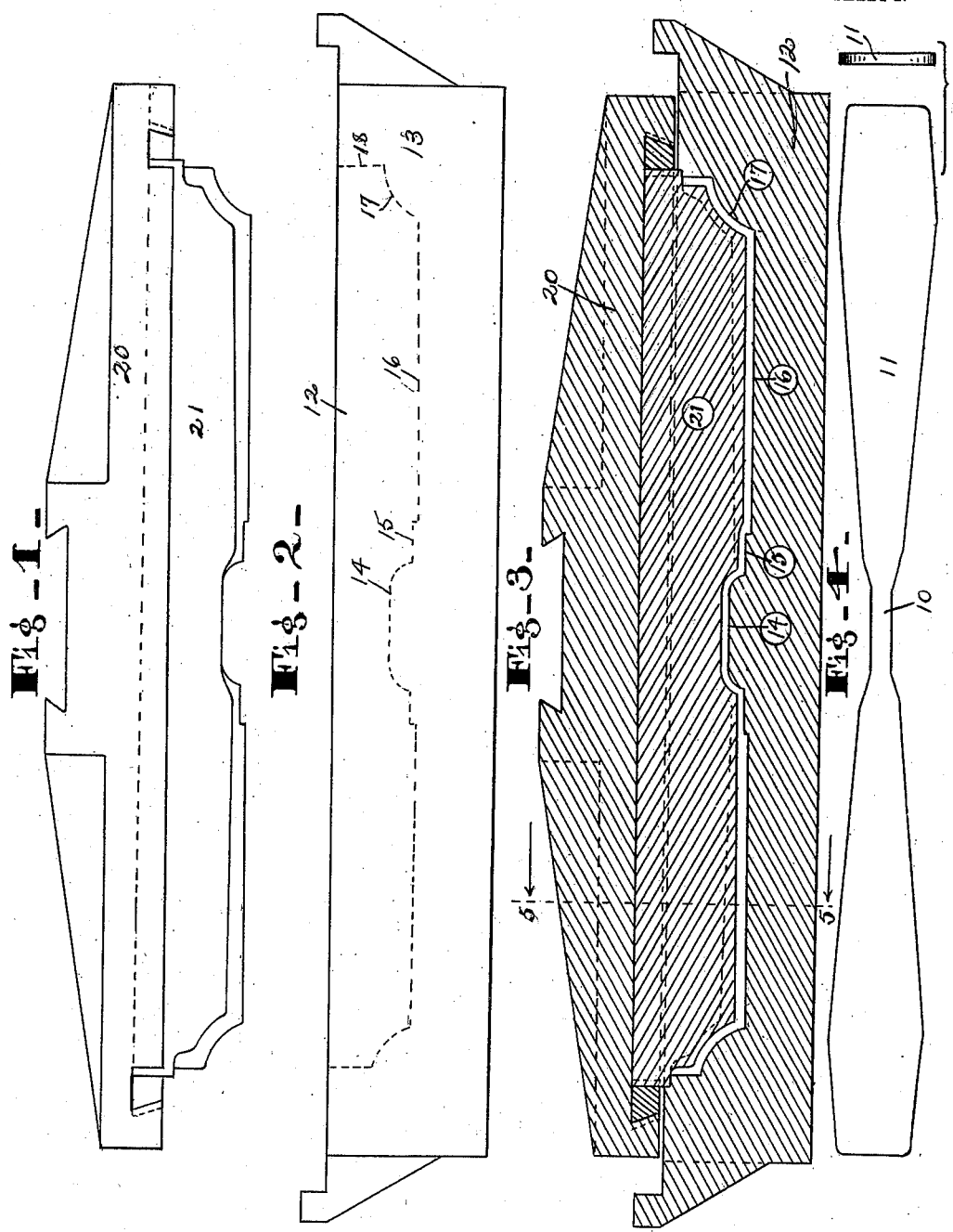

L. W. COPPOCK.
PROCESS OF FORMING STEEL CONNECTING RODS.
APPLICATION FILED FEB. 23, 1910.
986,547.
Patented Mar. 14, 1911.
4 SHEETS—SHEET 3.
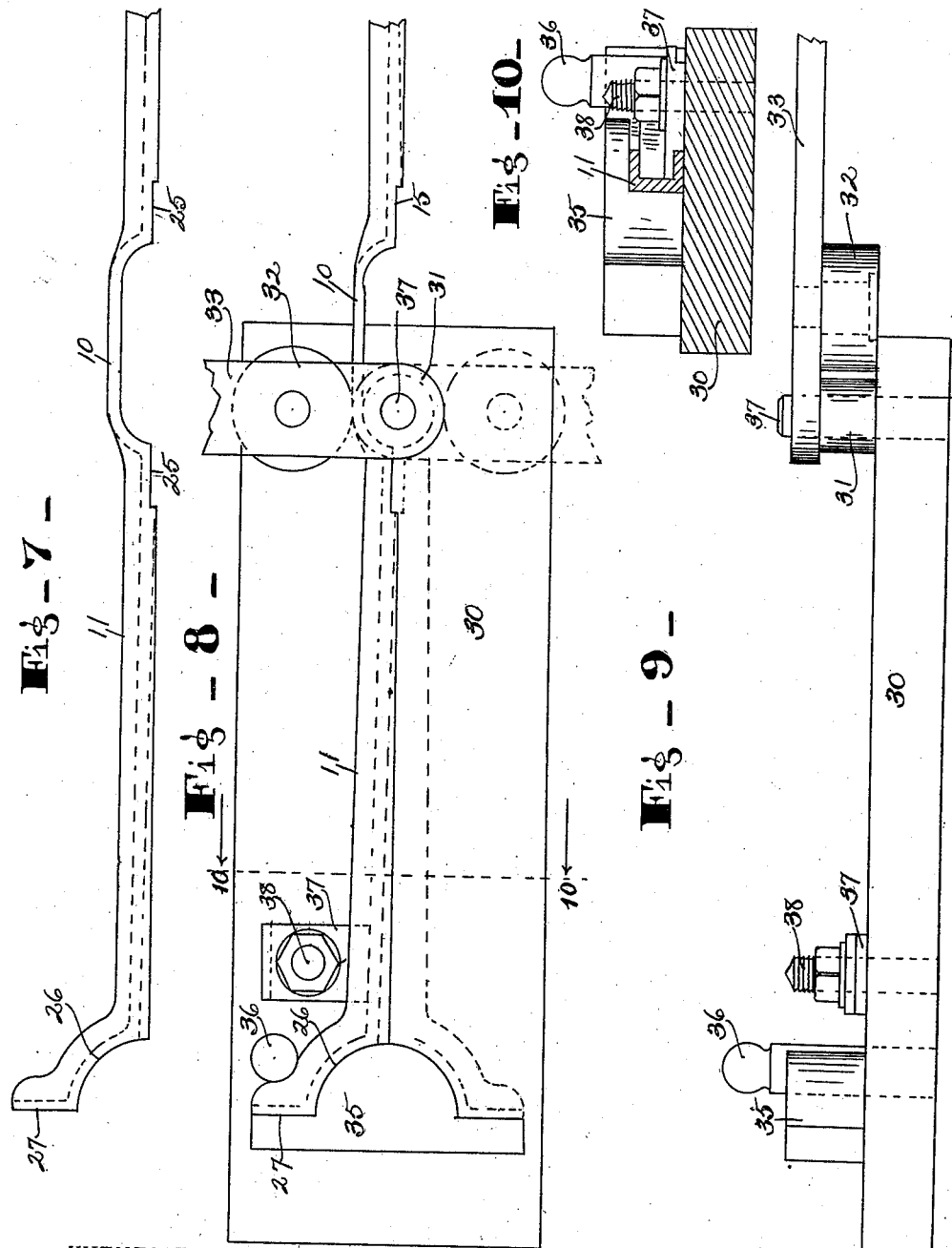
WITNESSES:
INVENTOR.
Lembert W. Coppock.
BY
ATTORNEY.

L. W. COPPOCK.
PROCESS OF FORMING STEEL CONNECTING RODS.
APPLICATION FILED FEB. 23, 1910.
986,547.
Patented Mar. 14, 1911.
4 SHEETS—SHEET 4.
Fig -11-
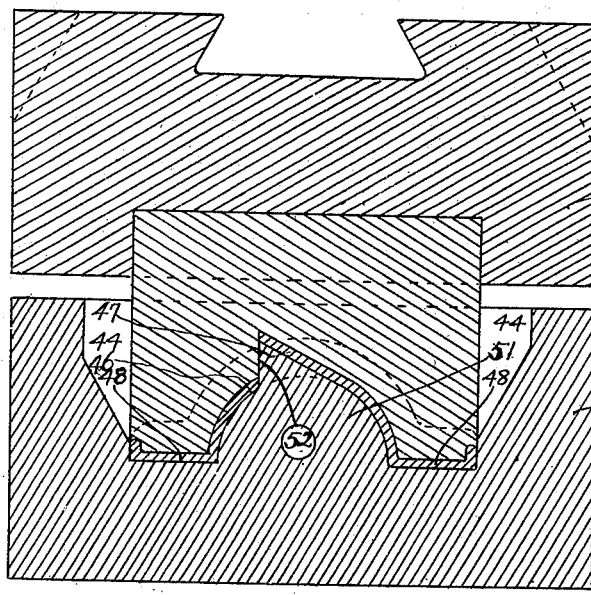
Fig -12-
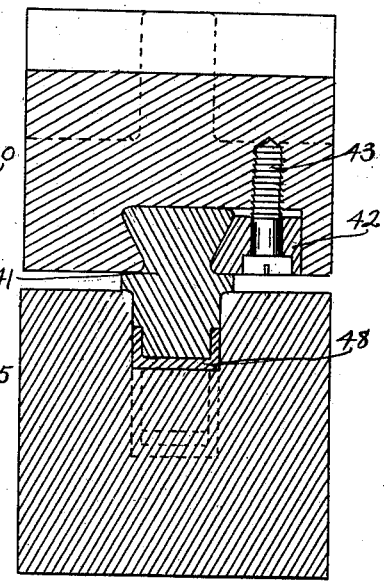
Fig -13-
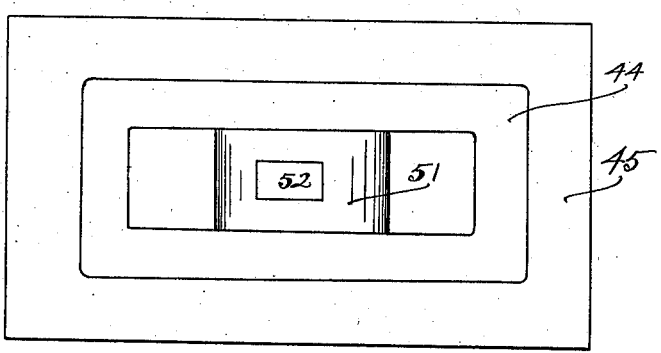
Fig -14-
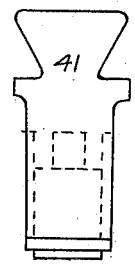
Fig -15-
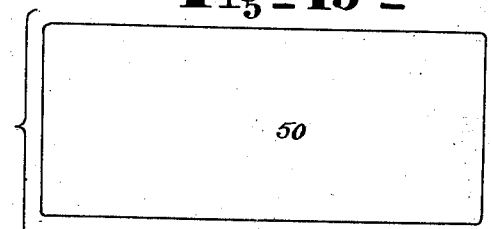
WITNESSES:
G. H. Brink
O. M. McLaughlin
INVENTOR.
Lembert W. Coppock.
BY
V. H. Lockwood
ATTORNEY.

UNITED STATES PATENT OFFICE.

LEMBERT W. COPPOCK, OF DECATUR, INDIANA, ASSIGNOR OF ONE-HALF TO JESSE G. NIBLICK, OF DECATUR, INDIANA.

PROCESS OF FORMING STEEL CONNECTING-RODS.

986,547. Specification of Letters Patent. Patented Mar. 14, 1911.

Application filed February 23, 1910. Serial No. 545,540.

*To all whom it may concern:*

Be it known that I, LEMBERT W. COPPOCK, of Decatur, county of Adams, and State of Indiana, have invented a certain new and useful Process of Forming Steel Connecting-Rods; and I do hereby declare that the following is a full, clear, and exact description thereof, reference being had to the accompanying drawings.

The object of this invention is to provide a novel process for making pressed steel connecting rods for engines.

The process consists essentially in taking a plate of steel, stamping or pressing it into a particular shape longitudinally and transversely so as to form two similarly shaped halves with the central portion of uniform shape and thickness, secondly, in centrally bending the rod so as to bring the two halves against each other, thirdly in electrically welding together the body portion of said two halves so as to form a solid connecting rod, and finally, forming a semi-circular member adapted to be secured to the main member of the connecting rod. The result of this operation is an extremely cheap and economically made connecting rod and one of great strength.

The nature of the invention will be understood from the accompanying drawings and the following description and claim.

In the drawings herein presented for illustrating the invention, Figure 1 is an elevation of the upper, male or cameo member of a pair of dies. Fig. 2 is the lower, female, or intaglio member of a pair of dies. Fig. 3 is a central vertical longitudinal section through the dies with the metal rod acted upon in place. Fig. 4 is a plan view of the blank rod before it is inserted between said dies, and also an end elevation thereof is shown in Fig. 4. Fig. 5 is a central vertical section through the dies on the line 5—5 of Fig. 3 and of the base on which it is mounted. Fig. 6 shows the central part of Fig. 5 before operation. Fig. 7 is a side elevation of a portion of a completed main member after it has been formed by the dies, a part of said member being broken away. Fig. 8 is a plan view of a bending machine for centrally bending said rod, the bent position being indicated by dotted lines. Fig. 9 is a side elevation of what is shown in Fig. 8, but with the connecting rod removed. Fig. 10 is a section on the line 10—10 of Fig. 8.

Fig. 11 is a longitudinal section of the dies for forming the semi-circular end member of the connecting rod. Fig. 12 is a transverse section thereof. Fig. 13 is a plan view of the lower mold shown in Fig. 11. Fig. 14 is an end elevation of the forming block shown in the central part of Figs. 11 and 12. Fig. 15 is a plan and edge view of a blank from which said end member of the connecting rod is formed.

A piece of flat steel such as is shown in Fig. 4 is first formed, the central part 10 thereof being narrowed for some distance and of uniform width, the two halves of said rod being of similar form and the width thereof increasing from a point near the center to a point near the end paddle-like. The thickness is uniform as indicated in the right-hand end of Fig. 4.

The steel blank shown in Fig. 4 is placed in the intaglio 12 of the die 13 shown in Figs. 1, 2 and 3. Said intaglio has a central raised portion 14 and a slightly raised portion 15 at each end thereof, and a long lower portion 16 at each end of the latter portion, and an arcuate portion 17 at the end of the long straight portion 16, and a vertical portion 18 at the end of the arcuate portion, the two halves being similarly shaped. Transversely, as seen in Fig. 6, the intaglio 12 for the end portions is widened at the upper end and has inwardly and downwardly inclined portions 19 below said vertical portion, and a contracted portion 20 with a convex portion 21 at the bottom. The upper member 20 of the dies has a cameo or male portion 21 adapted to conform with the intaglio 12 and with the lower portion thereof adapted to give to the blank or rod a desired shape both longitudinally and transversely, the cameo in longitudinal section being shown in Fig. 1, and the intaglio section being shown in Figs. 5 and 6. The latter is so arranged as to form the rod being swaged with a lower concave surface and with the sides extending at right-angles therefrom so as to be somewhat U-shaped in cross section. The resulting rod is partially shown in Fig. 7 and has a central portion 10 of reduced and uniform thickness, and two body portions of uniform thickness substantially excepting the offsets at 25 on each side of the portion 10. The two ends are similarly formed and have a portion 26 curved segmentally and extending about ninety degrees and then a vertical portion 27 extending from the extreme end thereof.

After the rod has been swaged in the manner indicated or in any other suitable way, it is placed in the bending device shown in Fig. 8. That device has a bed 30 with a cylindrical former 31 at one end against which the central portion 10 of the rod is placed so as to lie between that and the roller 32 carried by the handle bar 33, which is fulcrumed on the pin 34 that carries the former 31. The other end of the rod has its concave portion 26 placed against the convex surface of a semi-circular block 35 and lies between that block and the stop pin 36. The rod 11 is held in place against the parts 31 and 35 by the holding block 37 that is adjustably mounted on the set screw 38 extending up from the bed 30. When the rod is in place, as shown in Fig. 8, the hand lever 33 is turned from the position shown by full lines in Fig. 8 to the position shown by dotted lines therein, and such operation will force the outer half of the rod around to the dotted-line position shown in Fig. 8 and will completely form the small eye end of the connecting rod and bring the two main portions thereof against each other longitudinally.

After the connecting rod has been swaged and bent as heretofore explained, the adjacent members or parts thereof are electrically welded together so as to make a solid connecting rod with the small eye at one end and with one-half of a large eye formed at the other end. The other half of the large eye is formed as shown in Figs. 11 to 15. There is shown an upper die member 40 with a dove-tailed opening on the lower side to receive the dove-tailed end of the cameo die 41 that is held in place by the block 42 and the screw 43. Said cameo die is adapted to enter the end 44 of the intaglio member or die 45. The bottom of the intaglio has a central convex semi-circular portion 46 with a tangential projection 47, and there are two straight portions 48 on the side of said curved portion 46 so that the adjacent surfaces of the cameo and intaglio will agree with each other, and then the flat plate 50 is placed in the intaglio and the dies brought together, which will force the steel plate 47 in the form shown in Figs. 11, 12 and 13. Transversely it will be somewhat U-shaped and it will have a central semi-circular concave portion 51 with a tangential tongue 52 punched out so as to leave an opening therethrough. This constitutes the second member of a connecting rod and they are secured together by screws.

From the foregoing it is seen that by this process I am enabled to make cheaply and quickly a pressed-steel connecting rod capable of great strength and yet relatively light and constituting quite an improvement in the art of building engines, especially of the combustion or gasolene type.

What I claim as my invention and desire to secure by Letters Patent is:

The process of forming a pressed steel connecting rod, which process includes first forming a straight steel plate with a central uniformly narrow portion with expanding similarly formed halves extending therefrom, second, in swaging said plate so as to turn the edges of the widened halves thereof at corresponding angles to form the same substantially U-shaped in cross section and bending the central portion out of line with the main portion thereof and bending each end in the form of a quarter-circle with the extreme end portion thereof extending at a right angle to the main portion of the rod, thirdly, in centrally bending said rod so as to bring the main portions thereof into contact longitudinally of the rod, and simultaneously in electrically welding the adjacent portions of said rod together.

In witness whereof, I have hereunto affixed my signature in the presence of the witnesses herein named.

LEMBERT W. COPPOCK.

Witnesses:
BERNARD T. TERVEER,
ARTHUR D. SUTTLES.

---

Copies of this patent may be obtained for five cents each, by addressing the "Commissioner of Patents, Washington, D. C."